Dec. 13, 1927.
E. ROBERTS
1,652,799
BELT TENSIONING DEVICE
Filed July 28, 1924
3 Sheets-Sheet 3
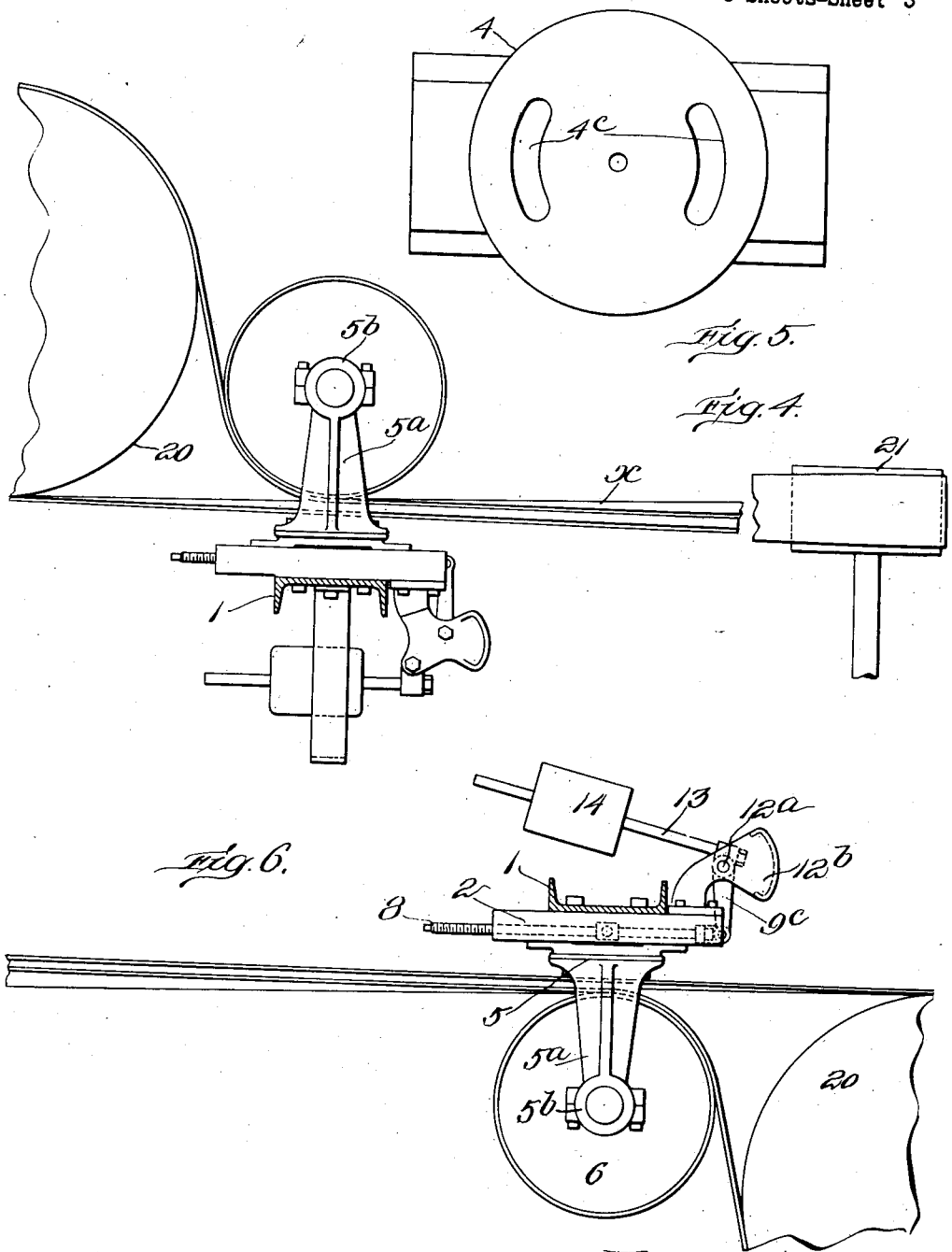

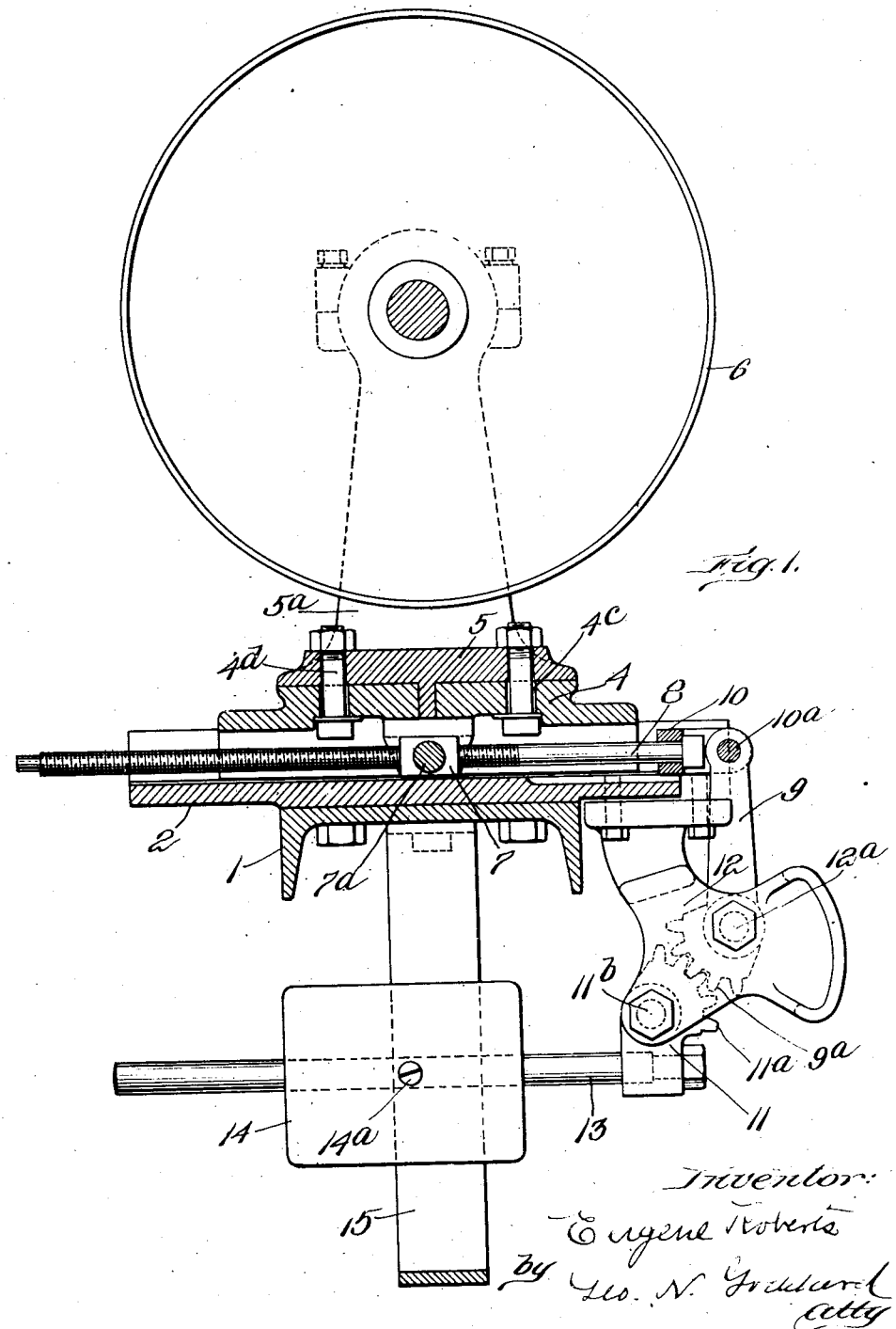

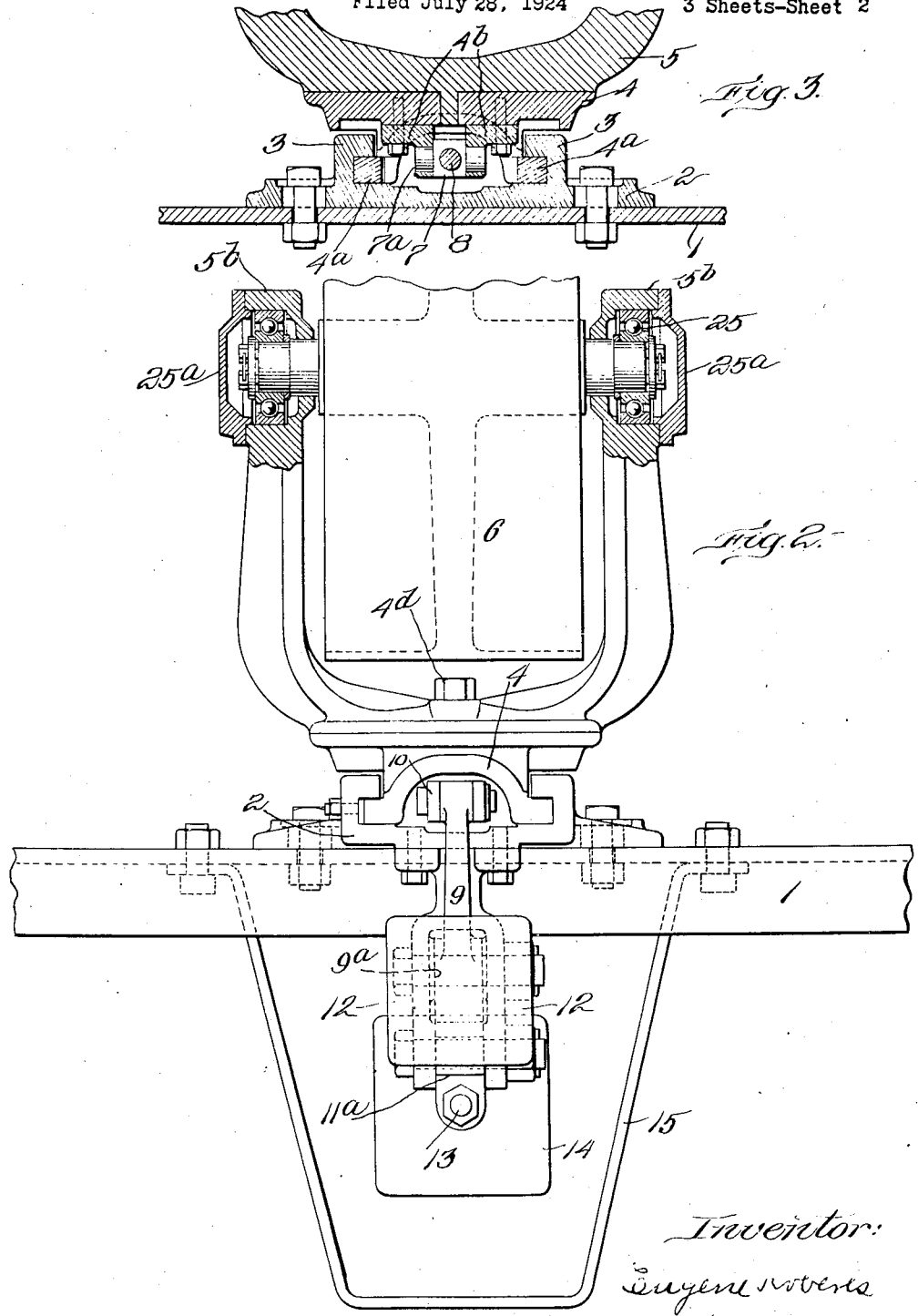

Patented Dec. 13, 1927.

1,652,799

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

BELT-TENSIONING DEVICE.

Application filed July 28, 1924. Serial No. 728,583.

This invention relates to belt tensioning devices, and is particularly intended to provide a device of this class suitable for driving a battery of centrifugal machines from a horizontal line shaft by means of quarter-turn belts running from individual driving pulleys on the line shaft to the centrifugal pulleys secured to the vertical basket shafts in order to rotate the separate centrifugals at the required speed.

Generally speaking, the invention comprises the combination of a fixed base member carrying a sliding carriage on which is mounted an idler pulley hanger by means of a connection permitting angular adjustment of the pulley and hanger to adapt it to the position of the quarter-turn belt, and a weight-actuated lever having suitable connection with the hanger-supporting carriage to maintain the idler pulley pressed strongly against the transmission belt through the weight-induced movement of the sliding carriage. The invention also resides in certain features of construction which permits the reversing of the pulley, that is, its arrangement either above or below its supporting base, according to the relative vertical location of the belt-driving pulley.

These and other features of the invention will be pointed out in the following specification and will be defined in the claims hereto annexed.

In the accompanying drawings I have shown a simple and convenient construction and arrangement embodying the features of this invention, in which:

Figure 1 is a side elevation, partly in central section, showing the idler pulley supported on its carriage above the fixed supporting base.

Figure 2 is an end elevation with the bearing boxes broken away to show the end thrust-supporting radial bearings.

Figure 3 is a detail view in central cross section of the supporting base and the lower part of the hanger and carriage.

Figure 4 is a side elevation showing an assembled view of the tensioning device in relation to the driving pulley and the quarter-turn transmission belt.

Figure 5 is a plan view of that portion of the carriage forming the support for the angularly adjustable idler hanger.

Figure 6 is a side elevation of the tensioning device arranged in its inverted position with a corresponding weight lever.

Ordinarily, where the line shaft is located somewhat above the level of the horizontal channel-bar which carries the tensioning idler, the idler pulley and its supporting carriage is mounted above the channel-bar to which the base member of the tensioning device is secured, as indicated in Figures 1, 2 and 4 especially.

In this case, on the channel beam 1, is bolted a fixed base member 2, which is provided with parallel up-turned and inwardly projecting ribs or track members 3 forming longitudinal ways for the reception and slidable support of a carriage 4 which has parallel slide portions 4$^a$, machined to fit inside of the guide ribs 3, so as to have slidable connection therewith.

The flat top of said carriage 4 is adapted to receive a corresponding head 5 of an idler pulley hanger which is provided with parallel upstanding arms 5$^a$ carrying, at their ends, bearing boxes 5$^b$, for the reception of the journals of the idler pulley. To avoid loss of power and also to properly sustain any side stresses due to the unbalanced strain of the quarter-turn belt which passes over the idler pulley 6, I provide the bearing-boxes 5$^b$ with radial ball-bearing elements 25, comprising outer and inner annular races interiorly grooved to a sufficient depth to adequately sustain side thrust or axial thrust of the idler pulley journals. Exterior caps 25$^a$ close the outer ends of the journal boxes.

The head 5 of the idler pulley hanger is bolted firmly to the corresponding portion of the carriage 4, by means of vertical bolts 4$^d$, passing through appropriate holes formed in the head 5 to register with curved slots 4$^c$, formed in the supporting carriage, in order that the hanger may be adjusted and secured in the proper angular relationship to best meet the stresses of the quarter-turn belt.

In order to keep the idler pulley pressed snugly against the belt to maintain the belt in taut condition, I provide a weight-actuated lever 9 to whose free end is pivotally connected a yoke or strap 10, which receives a draft-rod 8 which is screw-threaded and passed through a swivel nut 7 having lateral trunnions 7ª, mounted in bearing blocks 4ᵇ, fastened to the underside of the carriage between its track members or runners 4ª. As best shown in Figure 1, the head of the bolt has loose engagement with the cross member of a yoke 10 through which it passes, and by its threaded engagement with the swivel block 7, which is pivotally secured to the carriage, it has an adjustable draft connection with the carriage. The weight-actuated lever 9 is pivotally supported at one end of the device by means of a projecting detachable forked bracket 12, which carries a fulcral pin 12ª, upon which the lever is pivoted.

When the pulley is mounted above the belt, as in Figure 1, in order to avoid extending the weight-carrying arm still farther out beyond the tensioning device, the lever 9 is provided with a short arm in the form of a sector gear 9ª, and intermeshes with a similar sector arm 11ª of a lever 11, fulcrumed at 11ᵇ in the bracket, and a weight-rod 13 is secured to the lever 11 with an adjustable weight 14 slidably mounted thereon and secured in proper position of adjustment by said screw 14ª. A protective strap or loop 15 extends downward around the weight so as to hold it against dropping too far in case the belt lacing should break.

The pivotal connection between the draft rod 8 and the weight-actuated arm 9 at one end, and the carriage at the other end allows full freedom of movement to the carriage without binding of parts, and permits a very easy and convenient adjustment between the weight-actuated lever and the idler pulley carriage when the belt becomes stretched since, in order to accommodate such condition, it is merely necessary to rotate the draft rod 8 until the weight arm 13 extends approximately at a horizontal position when the idler pulley has exerted its normal tension against the belt to press the belt toward its driving pulley. The driving pulley itself, by reason of its angular adjustment in relation to its supporting carriage, as well as by reason of its anti-friction radial bearings arranged to resist the axial thrust of the pulley, functions with the least possible loss of power and also is completely responsive to its duty of keeping the belt under a constant or uniform tension.

What I claim is:

1. In a belt tensioning device, the combination with a fixed base, a carriage slidably mounted thereon by connections permitting the base and the carriage to operate when arranged in inverted position, a weight-actuated lever having reversible connection with said carriage, an idler pulley mounted on said carriage and normally pressed against the belt by the action of the weight-actuated lever on the carriage, substantially as described.

2. In a belt tensioning device, the combination of a base, a slidable carriage supported thereby, a pulley-supporting hanger secured to said carriage to permit angular adjustment of the pulley in relation to a quarter-turn belt, said hanging being provided with radial ball bearings arranged to sustain axial stress of the pulley, and an actuating lever interconnected with said carriage to maintain the pulley in tensioning contact with the belt, substantially as described.

3. In a belt-tensioning device, the combination with a fixed base, of a slidable carriage, a belt pulley hanger secured to said carriage, a draft-rod pivotally connected with the carriage, a tensioning weight arm interconnected to the draft-rod by a combined pivotal and swivel connection to permit the draft-rod to be rotated for longitudinal adjustment in order to bring the weight-arm into proper operative position for effectively tensioning the belt.

4. In a belt-tensioning device, the combination with a fixed base, a carriage slidably connected therewith, a belt-pulley hanger, means for securing said hanger to the carriage in different angular relations, a rotatively adjustable draft-rod having pivotal connection with said carriage, a weight-actuated arm having its pivotal connection with said draft-rod to allow the rotation of said draft-rod for adjustment, substantially as described.

5. In a belt-tensioning device, the combination with a base member adapted to be secured either above or below a supporting member to permit its adjustment in reverse positions, a slidable carriage slidably mounted in said base, a belt-pulley hanger rigidly secured thereto by connections permitting angular adjustment, a longitudinally adjustable draft-rod connected with said carriage, a reversible weight arm and lever connected with said draft-rod so as to produce tension of the pulley against the belt when the base is reversed to bring the pulley underneath.

6. In a belt-tensioning device, the combination with a fixed base, of a slidable carriage mounted to slide therein, a weight-actuated arm, a link pivotally connected with said weight-actuated arm, a draft-rod having rotative connection with said link and having also rotative and adjustable connection with said carriage whereby, upon rotation with the draft-rod, the carriage may be positioned to belt-tensioning position with the weight arm in proper position to exert a tensioning thrust upon the carriage through said draft-rod.

In witness whereof, I have subscribed the above specification.

EUGENE ROBERTS.